United States Patent
Horii et al.

(10) Patent No.: US 12,353,673 B2
(45) Date of Patent: Jul. 8, 2025

(54) CONTROL-DECK GRAPHICAL USER INTERFACE IN XR

(71) Applicant: Samsung Electronics Co., Ltd., Suwon-si (KR)

(72) Inventors: Hiroshi Horii, Pleasanton, CA (US); Edgar Evangelista, San Jose, CA (US); Jaehyun Kim, San Francisco, CA (US); Stephanie Kim Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 18/203,882

(22) Filed: May 31, 2023

(65) Prior Publication Data

US 2024/0019981 A1    Jan. 18, 2024

Related U.S. Application Data

(60) Provisional application No. 63/389,529, filed on Jul. 15, 2022.

(51) Int. Cl.
*G06T 19/00* (2011.01)
*G06F 3/04815* (2022.01)
*G06F 3/0483* (2013.01)

(52) U.S. Cl.
CPC ........ *G06F 3/04815* (2013.01); *G06F 3/0483* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 10,175,483 B2 | 1/2019 | Salter | |
| 10,536,691 B2 | 1/2020 | Valdivia | |
| 10,573,081 B2 | 2/2020 | Tomizuka | |
| 11,003,307 B1 | 5/2021 | Ravasz | |
| 11,113,893 B1 | 9/2021 | Ma | |
| 11,294,461 B2 | 4/2022 | Stolzenberg | |
| 11,335,068 B2 | 5/2022 | Schubert | |
| 2013/0019182 A1 | 1/2013 | Gil | |
| 2018/0096506 A1 | 4/2018 | Valdivia | |
| 2018/0307303 A1 | 10/2018 | Powderly | |
| 2019/0213792 A1 | 7/2019 | Jakubzak | |
| 2019/0339837 A1 | 11/2019 | Furtwangler | |
| 2021/0011556 A1* | 1/2021 | Atlas | G06T 19/006 |
| 2022/0222900 A1 | 7/2022 | Tomizuka | |
| 2023/0316594 A1* | 10/2023 | Lai | G06F 9/453 |
| | | | 345/629 |

* cited by examiner

*Primary Examiner* — Robert J Craddock

(57) ABSTRACT

In one embodiment, a method includes presenting, to a user in an XR environment, a persistent GUI element that includes a control deck. The control deck includes one or more first interactive elements, each first interactive element associated with a particular function. The method further includes locking, in a first control-deck mode, the control deck to the user such that the control deck appears at the same relative position to the user regardless of the user's movements in the XR environment.

20 Claims, 6 Drawing Sheets

CONTROL-DECK GRAPHICAL USER INTERFACE IN XR

PRIORITY CLAIM

This application claims the benefit under 35 U.S.C. § 119 of U.S. Provisional Patent Application 63/389,529 filed Jul. 15, 2022, which is incorporated by reference herein.

TECHNICAL FIELD

This application generally relates to a graphical user interface (GUI) in extended reality (XR) applications.

BACKGROUND

An extended reality (XR) system can include displaying computer-generated content combined with a real-world scene, for example as in augmented reality, or can include display of only computer-generated content, such as in virtual reality. The display is typically three dimensional. An XR system can include, for example, a head-mounted display (HMD), such as a headset, a pair of glasses, etc., that includes one or more displays for displaying XR content. XR content can include virtual objects or content from one or more applications, such as a web browser, a productivity application, a gaming application, etc., and this content can be displayed along with portions of a user's physical environment, i.e., the real-world environment in the vicinity of the user.

DESCRIPTION OF EXAMPLE EMBODIMENTS

XR environments can be much more dynamic than traditional computing environments, for example because users are not limited to physical displays for viewing content and instead can place XR windows and virtual objects anywhere in the XR space, including by moving an object in three dimensions. XR objects may not have a taskbar or menu bar, and even when they do it may be difficult for users to locate such items or access such items, given the variety of places XR content can be located, including relatively far away from the user. In addition, providing a menu or command bar with every XR window or XR object can clutter the XR space and detract from the XR experience.

Figure 1:
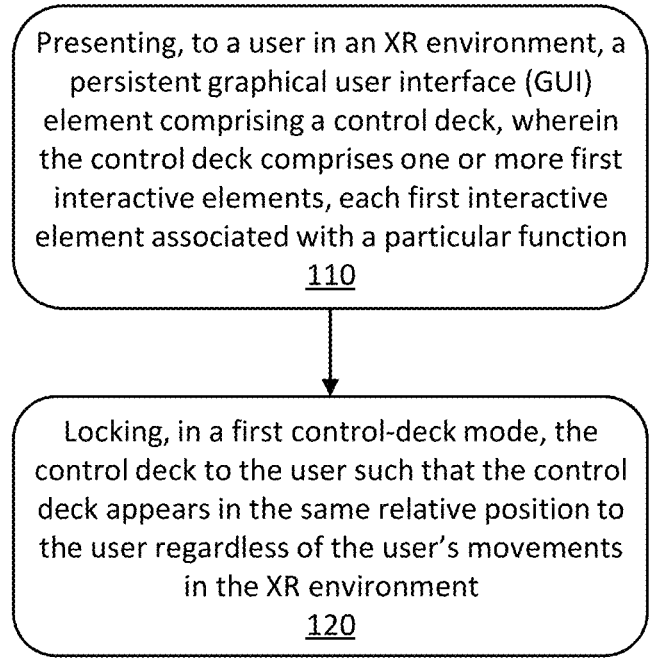
FIG. 1 illustrates an example method for displaying a control-deck GUI to a user.

FIG. 1 illustrates an example method for displaying a control-deck graphical user interface (GUI) to a user, for example to organize and streamline user control and interactions in the XR space. Step 110 of the example method of FIG. 1 includes presenting, to a user in an XR environment, a persistent GUI element including a control deck. For example, a user may be wearing a head-mounted device that includes a display that is displaying XR content to the user. The XR environment may include virtual content, such as content from applications, and real-world content in the user's physical environment.

Figure 2:
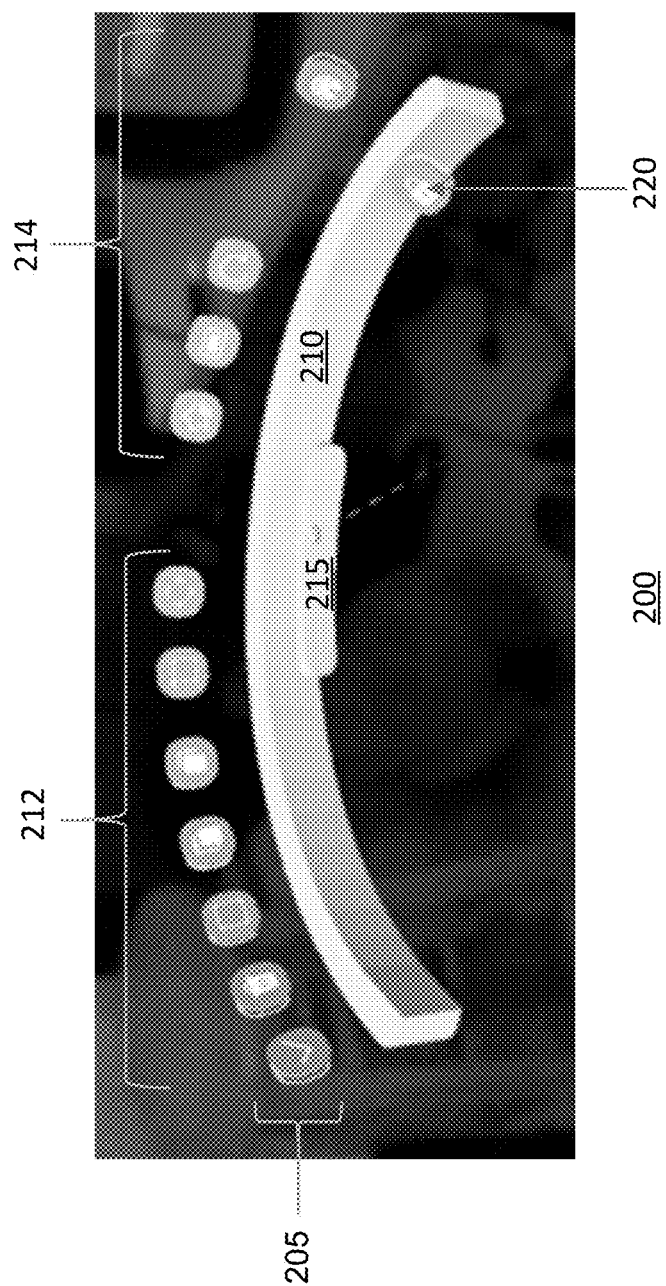
FIG. 2 illustrates an example control deck.

FIG. 2 illustrates an example control deck 200 of the example method of FIG. 1. The control deck is persistent in that is always displayed in the XR environment, at least until the user minimizes or dismisses the control deck, in particular embodiments. As illustrated in FIG. 1, control deck 200 includes first interactive elements 205, and each first interactive element is associated with a particular function, which may be one or more functions. In the example of FIG. 1, control deck 200 also includes a body 210 and a drawer 215, which is described more fully herein. Control deck 200 also includes a position lock 220, which is described more fully herein.

Figure 3:
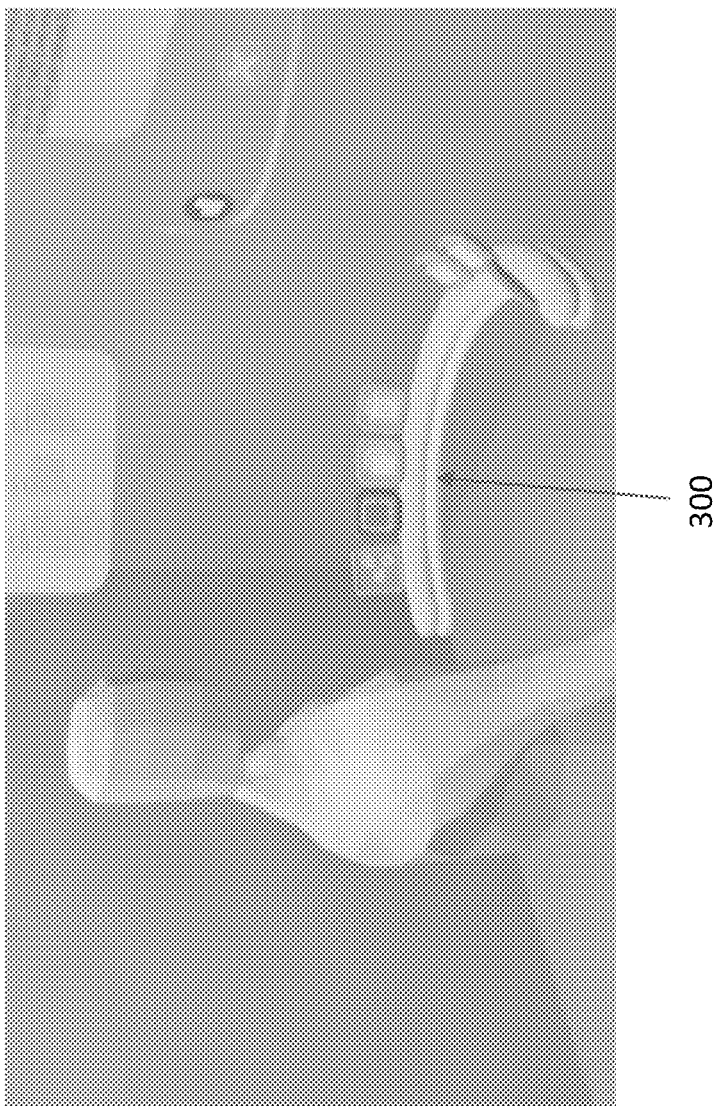
FIG. 3 illustrates an example position of a control deck relative to a user.

As illustrated in FIG. 2, control deck 200 provides convenient access to commands, previously saved items, and other functionality in the XR space. The control deck may be a three-dimensional UI. For example, as illustrated in FIG. 2, control deck 200 has a substantially curved shaped in 3D space, although this disclosure contemplates that a control deck may take any suitable shape. In particular embodiments, each of the first interactive elements may be positioned in the control deck such that they are equidistant from the user in the XR space (i.e., each first interactive element is x distance away from the user). In particular embodiments, the control deck may be positioned at about the waist level of the user in the XR space, for example as illustrated in FIG. 3, although, in particular embodiments, the user may reposition the control deck to be located at a different position, as explained more fully herein. While this disclosure describes example shapes and positions of a control deck, this disclosure contemplates that other shapes and positions may be used. In particular embodiments, when a user starts the XR environment, the control deck may provide a home screen for the user, for example from which the user may select particular applications and/or commands to interact with the XR environment.

In particular embodiments, some of the first interactive elements may be universal elements that appear persistently along with the control deck. For example, universal elements may include a select tool, a move tool, a copy tool, etc. In particular embodiments, at least some of the first interactive elements may be associated with functions specific to a particular XR application. For example, if a user is using a web browsing application, then the first interactive elements may include a "go back" element, a "home page" element, etc. When a user opens another application, such as for example a video-playing application, then these application-specific first interactive elements may be updated so that their functionality is associated with the video-playing application (e.g., by removing the elements specific to the web browser and including a "fast forward" element, a "pause" element, etc.). In particular embodiments, the application-specific first interactive elements may be updated by changing their functionality and appearance (e.g., an icon associated with the first interactive element) in the control deck. In particular embodiments, application-specific first interactive elements may be updated when a user's focus in the XR space (e.g., as determined by eye tracking, or by user selection or current use) changes. For example, if the user has two or more applications open, then the application-specific first interactive elements displayed on the control deck may be based on which application the user is focusing on. In particular embodiments, at least some first interactive elements may depend on the context associated with the user, such as the time of day and/or the physical environment of the user.

In particular embodiments, universal elements and application-specific elements may be grouped together. For instance, in the example of FIG. 2, elements 212 are universal elements, while elements 214 are application-specific elements. In particular embodiments, a user may rearrange the order of, and/or position of, universal elements or application-specific elements, or both. In particular embodiments, a user may rearrange universal elements and application-specific elements such that the elements are mixed with each other in the control deck.

Figure 4:
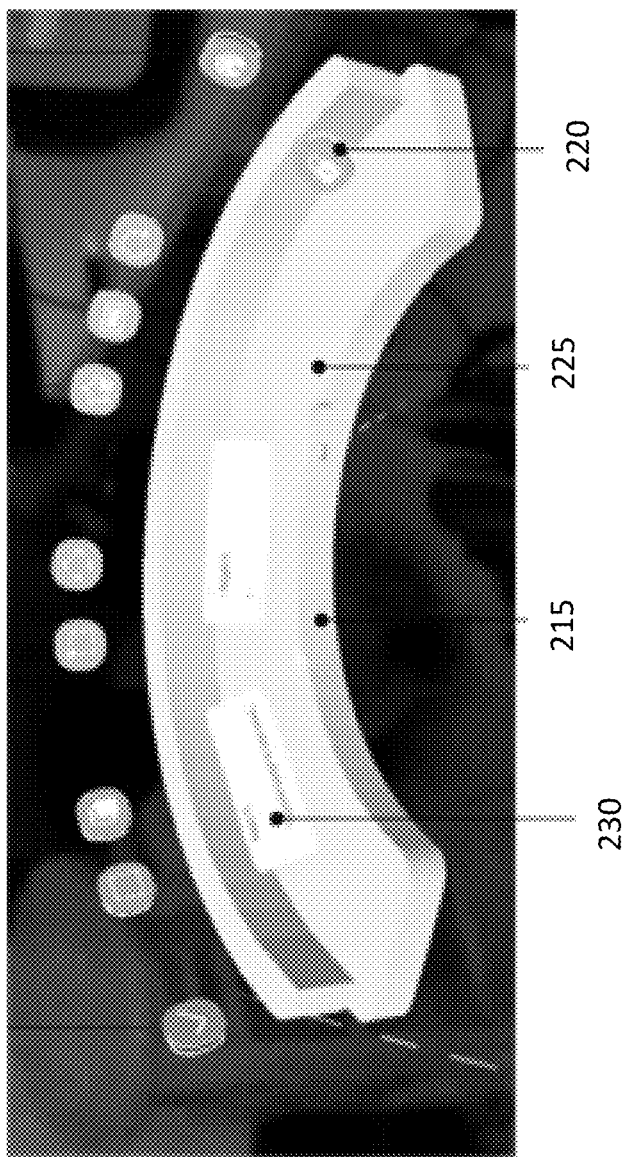
FIG. 4 illustrates an example control deck after a user interacts with a second-level object.

In particular embodiments, a control deck may include one or more second interactive elements. In particular embodiments, the first interactive elements may be immediately accessible from the control deck, while the second interactive elements may be accessible after the user interacts with an associated second-level object that stores some or all of the second interactive elements. For instance, the example control deck 200 of FIG. 2 illustrates that first interactive elements 210 are immediately accessible by a user, while second interactive elements are surfaced only after the user selects a second-level object, such as drawer 215. After selecting drawer 215, some or all of the second interactive elements may then be displayed with the control deck. For example, FIG. 4 illustrates an example control deck after a user has interacted with drawer 215, causing drawer 215 to open and reveal the interior 225 of drawer 215. As illustrated in FIG. 4, opening drawer 215 reveals one or more second interactive elements 230, so that the user can interact with those elements. The user may hide the second elements 230 by again interacting with drawer 215 to close the drawer.

In particular embodiments, second interactive elements may be previously saved content, for example content pasted to a clipboard associated with the user in the XR environment. In particular embodiments, the second interactive elements surfaced to a user when the user opens a drawer may depend on the context, for example based on the particular application the user is interacting with or focusing on. For example, if a user is interacting with an application for creating a presentation, then the second interactive elements may be previously copied images. If the user is working on a text document, then the second interactive elements may be previously copied text strings. If the user is browsing webpages, then the second interactive elements may be previously saved webpages, such as bookmarked webpages. In particular embodiments, second interactive elements may be the most relevant content (e.g., based on the user's current application) selected from a system clipboard. For example, the clipboard may contain both text and images, and the images may be selected when a user is working with a picture-editing application. In particular embodiments, different clipboards may be associated with different applications or context, and the second interactive elements may be selected from the associated clipboard.

In particular embodiments, when a user interacts with a drawer to reveal second interactive elements, each element may provide a preview of the content associated with that element. For example, an image may be represented by a thumbnail, and a webpage may be represented by a snippet of that webpage or an icon associated with the webpage. In particular embodiments, the number of second interactive elements to display may be associated with a threshold so that the second level of the control deck does not get too crowded. For example, in particular embodiments up to three second interactive elements may be displayed. In particular embodiments, the threshold may be based on the size of the second interactive elements, which may be adjusted by a user. In particular embodiments, a threshold may be set by a user. In particular embodiments, a user may scroll through second interactive elements to navigate among second interactive elements contained within a particular drawer.

In particular embodiments, second interactive elements may include collections of content. For example, a user may open a map and may pin particular pictures to specific locations on the map. The map, pictures, and the user's annotations (e.g., pins) regarding the relationship between those content items may be saved in a package, and the package may be represented by a second interactive element. For example, if a user focuses on a map application, then upon opening a drawer the user may be presented with an icon representing the package, and selecting the icon may pull up for display the maps and pictures as last edited by the user. In particular embodiments, such content may be shared between users, so that, for example, if a first user sends the package to a second user, then when the second user interacts with a map application or with a communication with the first user, then the second user's drawer may include the package from the first user.

A user can interact with a second-level object, such as drawer 215, by any suitable method. For example, a user can tap on the drawer to open or close it, or could pull on the drawer (e.g., as if opening a physical drawer) to open it, and push on the drawer to close it.

While the disclosure above describes a drawer as a specific example of a second-level object that, when interacted with, displays second interactive elements, this disclosure contemplates that other second-level objects may be used. Moreover, while FIG. 4 illustrates a single drawer, this disclosure contemplates that multiple drawers or other second-level objects may be presented to a user in connection with a control deck, and each second-level object may be associated with different second interactive elements.

In particular embodiments, a control deck can be minimized by the user so that the control deck is no longer displayed. In particular embodiments, the control deck may completely disappear, or may be replaced by, e.g., an icon representing the control deck. Selecting the icon may restore the control deck to its full size. In particular embodiments, the control deck can be minimized by using an associated first interactive element, for example an element that is grouped with universal tools. In particular embodiments, a control deck may be minimized by, e.g., using a gesture. In particular embodiments, the control deck may be manually resized by a user.

Figure 5:
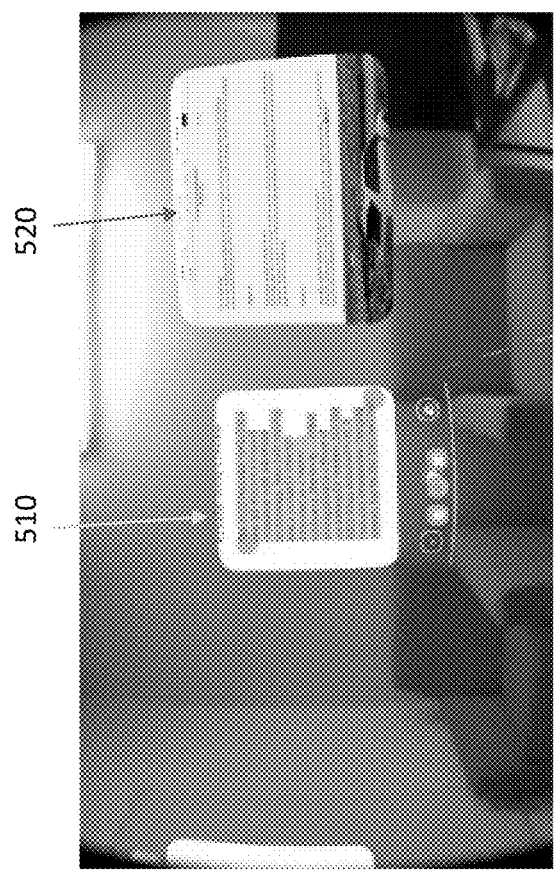
FIG. 5 illustrates example panels in XR space.
Figure 5:
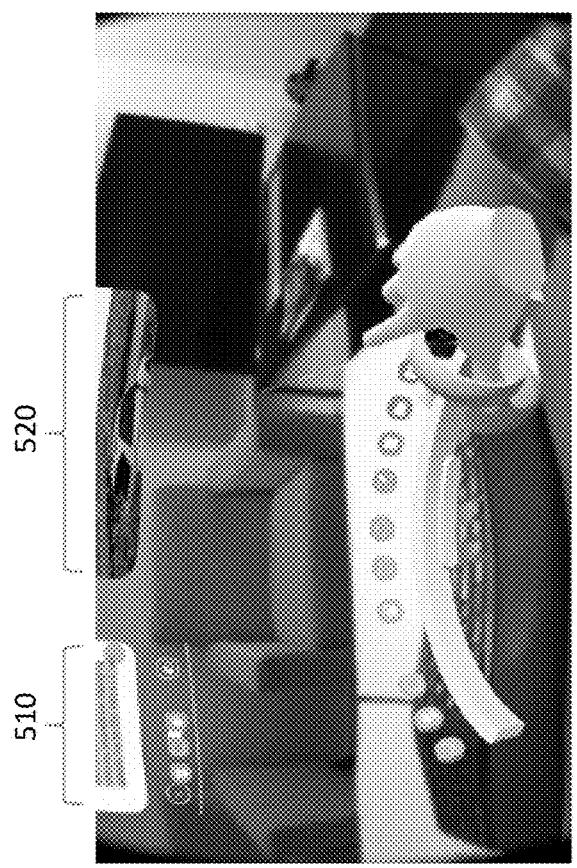

In particular embodiments, a control deck may include a selection tool, for example by displaying a first interactive element associated with the tool. In particular embodiments, a dedicated selection tool is useful because it can be difficult in XR space to differentiate between selection of an interface as a whole and selection of particular content, such as text, displayed by the interface. For example, FIG. 5 illustrates example panels 510 and 520, and a user tapping on, or otherwise gesturing on or toward, panel 510 may be interpreted as an indication that the user wants to select panel 510, e.g., to move its position in the XR space. However, by providing a dedicated selection tool, particular embodiments permit a user to select particular content within an interface, such as panel 510. As illustrated in FIG. 5, selected content may be highlighted within the interface, and a user can manually adjust the selection, e.g., by adjusting ball cursors associated with the selected portion. In particular embodiments, the selection tool may be universal tool for the control deck.

In particular embodiments, a control deck may include a copy tool or a paste tool, or both. For example, these tools may be part of the universal tools of a control deck, or may appear in the application-specific tools after a user has selected content. In particular embodiments, a copy tool and a paste tool may be particularly useful in XR environments because the content itself may be farther away from the user in XR space than is the control deck, and thus the control deck may provide easier access to such tools. In particular embodiments, copied content may be associated with a second interactive element.

In particular embodiments, a control deck may include a move tool that allows a user to select an object, such as a panel, in XR space and move or otherwise manipulate that object. A move tool may be a universal tool. In particular embodiments, a move tool ensures that a user's intention to move an object is clearly distinguishable from other interactions (e.g., selection).

Step 120 of the example method of FIG. 2 includes locking, in a first control-deck mode, the control deck to the user such that the control deck appears at the same relative position to the user regardless of the user's movements in the XR environment. For instance, in the example of FIG. 3, control deck 300 locked in the first mode maintains its position relative to the user even as the user moves throughout the XR space or changes their point of view in the XR space (e.g., by turning their head). As explained above, this position may be at about the waist level of the user and within arm's reach of the user, and may track the user's head orientation/gaze direction. In particular embodiments, this user-centric location in the first mode may be personalized to the user.

In particular embodiments, a user can unlock a control deck from their body or lock the control deck to their body by, e.g., toggling an associated interface element such as position lock 220 in the example of FIG. 2. In particular embodiments, a user may unlock a control deck from their body, move the control deck to another location, and then lock the control deck to that fixed location.

In particular embodiments, a control deck may automatically unlock from a user's body, at least temporarily, based on the presence of one or more objects in the XR environment. For example, if the system detects that one or more objects or obstacles are near the user and would prohibit the user's free arm movement from interacting with a portion of the control deck, then the system may unlock the control deck from the user's body and move the control deck to, or keep it in, a position such that the user can interact with the whole control deck without interference from the object. For example, an XR system or associated device (e.g., a physically or wirelessly connected camera) may determine that the user is within a predetermined distance of and orientation relative to an object in the user's physical environment that would interfere with the user's interaction with the control deck, and the system may then unlock the control deck from the user. In particular embodiments, a similar process may be used for virtual objects, such that the control deck does not appear to overlap or collide with virtual objects in the XR space or require that the user do so in order to interact with the control deck.

In particular embodiments, if the XR system (or a connected device) detects a surface in the vicinity of the user (such as within a predetermined orientation and distance from the user), then the system may automatically reposition the control deck to sit on the surface, and/or may lock the control deck to that surface. For example, if the XR system detects a desk near the user that the user is facing or moves to sit at, then the system may automatically position the height of the control deck so that it appears to sit on the desk surface relative to the user. The system may lock the control deck to the surface, for example while the user is within a specific distance of the surface, so that even if the user moves (e.g., by turning their head, or leaning over) the control deck stays locked to the surface.

In particular embodiments, a user can manually toggle the control deck between a first mode in which the control deck is locked to the user and a second mode in which the control deck is locked to fixed point in space.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 6, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 6, by a processor coupled to non-transitory computer readable storage media, or any suitable combination thereof. In particular embodiments, some or all of the steps of the example of FIG. 1 may be performed by an HMD.

Figure 6:
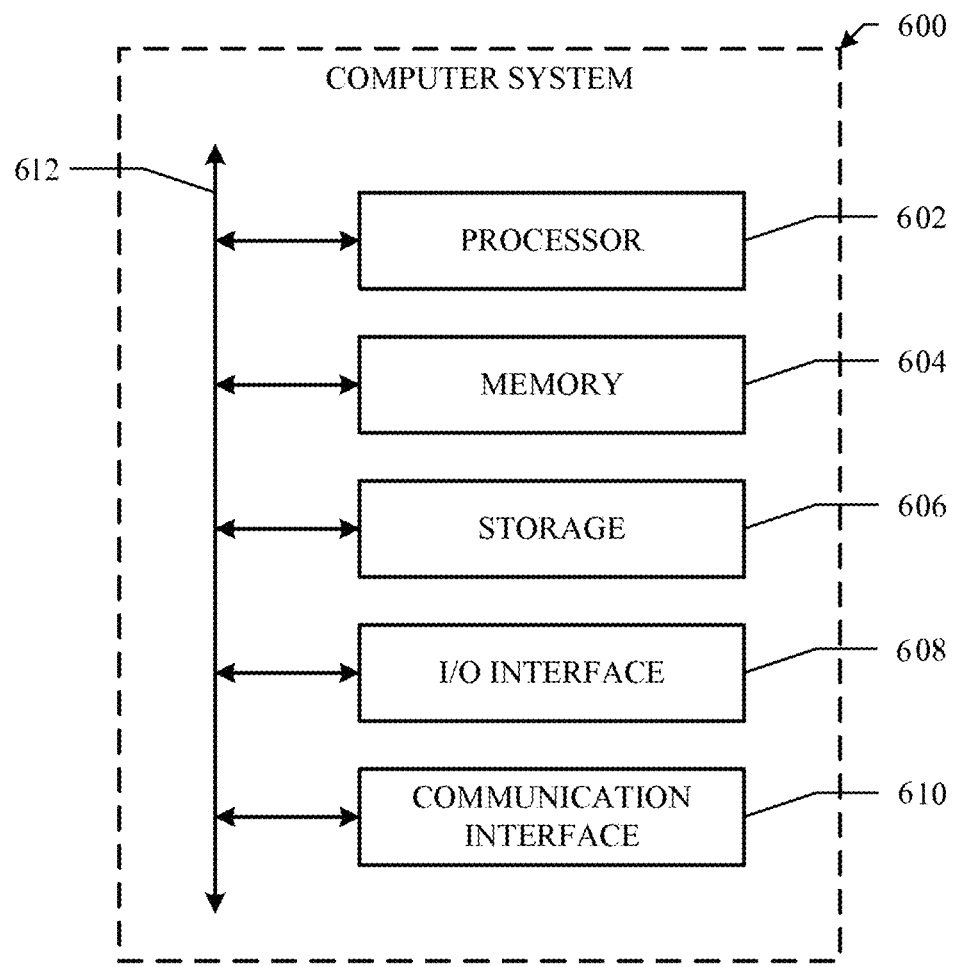
FIG. 6 illustrates an example computing system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
    presenting, to a user in an XR environment, a persistent graphical user interface (GUI) element comprising a control deck, wherein the control deck comprises one or more first interactive elements, each first interactive element associated with a particular function; and
    locking, in a first control-deck mode, the control deck to the user such that the control deck appears at the same relative position to the user regardless of the user's movements in the XR environment.

2. The method of claim 1, wherein the control deck further comprises one or more second interactive elements, each second interactive element associated with a previously saved content item.

3. The method of claim 1, wherein:
    the control deck further comprises one or more second interactive elements;
    the first interactive elements are presented at a first level of the control deck, wherein elements in the first level are immediately accessible for user interaction; and
    the second interactive elements are presented in a second level of the control deck, wherein elements in the second level are accessible only after the user interacts with a second-level object that stores at least some second interactive elements.

4. The method of claim 3, wherein the control deck comprises a plurality of second-level objects, each second level object storing one or more second interactive elements, the method further comprising:
    determining that the user has interacted with a particular second-level object; and
    in response to determining that the user has interacted with the particular second-level object, then displaying a preview of the one or more second interactive elements stored by that particular second-level object.

5. The method of claim 1, wherein at least some of the one or more first interactive elements are associated with functions that are specific to a first XR application.

6. The method of claim 5, further comprising:
determining that the user selected a second XR application; and
updating the at least some of the one or more first interactive elements to be associated with functions specific to the second XR application.

7. The method of claim 1, wherein the control deck has a curved shape and is positioned in the XR environment at about a waist level of the user.

8. The method of claim 7, wherein each first interactive element is positioned equidistant from the user in the XR environment.

9. The method of claim 1, further comprising, in response either to input from the user or based on or more objects in the XR environment, unlocking the control deck from the user such that the control deck appears to stay in a fixed position in the XR environment, regardless of the user's motion.

10. The method of claim 9, further comprising:
determining that the user is within a predetermined distance of and orientation relative to a surface in the user's physical environment; and;
in response to the determination, locking the control deck to the surface.

11. The method of claim 10, wherein the surface comprises a surface of a desk or of a table.

12. The method of claim 9, further comprising:
detecting the one or more objects in the XR environment;
determining whether one or more of the detected objects is located within a locked-control-deck region of the XR environment such that the one or more objects interfere with the user's ability to interact with at least a portion of the control deck when locked to the user; and
in response to determining that a detected object is located with the locked-control-deck region in the XR environment, then unlocking the control deck from the user.

13. One or more non-transitory computer readable storage media storing instructions and coupled to one or more processors that are operable to execute the instructions to:
present, to a user in an XR environment, a persistent graphical user interface (GUI) element comprising a control deck, wherein the control deck comprises one or more first interactive elements, each first interactive element associated with a particular function; and
lock, in a first control-deck mode, the control deck to the user such that the control deck appears at the same relative position to the user regardless of the user's movements in the XR environment.

14. The media of claim 13, wherein:
the control deck further comprises one or more second interactive elements;
the first interactive elements are presented at a first level of the control deck, wherein elements in the first level are immediately accessible for user interaction; and
the second interactive elements are presented in a second level of the control deck, wherein elements in the second level are accessible only after the user interacts with a second-level object that stores at least some second interactive elements.

15. The media of claim 13, wherein the control deck comprises a curved shape and is positioned in the XR environment at about a waist level of the user.

16. The media of claim 13, further coupled to one or more processors that are operable to execute the instructions to:
determine that the user is within a predetermined distance of and orientation relative to a surface in the user's physical environment; and;
in response to the determination, lock the control deck to the surface.

17. A system comprising: one or more non-transitory computer readable storage media storing instructions; and one or more processors coupled to the non-transitory computer readable storage media, the one or more processors operable to execute the instructions to:
present, to a user in an XR environment, a persistent graphical user interface (GUI) element comprising a control deck, wherein the control deck comprises one or more first interactive elements, each first interactive element associated with a particular function; and
lock, in a first control-deck mode, the control deck to the user such that the control deck appears at the same relative position to the user regardless of the user's movements in the XR environment.

18. The system of claim 17, wherein:
the control deck further comprises one or more second interactive elements;
the first interactive elements are presented at a first level of the control deck, wherein elements in the first level are immediately accessible for user interaction; and
the second interactive elements are presented in a second level of the control deck, wherein elements in the second level are accessible only after the user interacts with a second-level object that stores at least some second interactive elements.

19. The system of claim 17, wherein the control deck comprises a curved shape and is positioned in the XR environment at about a waist level of the user.

20. The system of claim 17, further comprising one or more processors that are operable to execute the instructions to:
determine that the user is within a predetermined distance of and orientation relative to a surface in the user's physical environment; and;
in response to the determination, lock the control deck to the surface.

* * * * *